US012603401B2

(12) United States Patent
Imamoto

(10) Patent No.: US 12,603,401 B2
(45) Date of Patent: Apr. 14, 2026

(54) TERMINAL RESIN FILM AND POWER STORAGE DEVICE USING SAME

(71) Applicant: TOPPAN INC., Tokyo (JP)

(72) Inventor: Junya Imamoto, Tokyo (JP)

(73) Assignee: TOPPAN INC., Tokyo (JP)

( * ) Notice: Subject to any disclaimer, the term of this patent is extended or adjusted under 35 U.S.C. 154(b) by 523 days.

(21) Appl. No.: 18/196,302

(22) Filed: May 11, 2023

(65) Prior Publication Data

US 2023/0318154 A1     Oct. 5, 2023

Related U.S. Application Data

(63) Continuation of application No. PCT/JP2021/041140, filed on Nov. 9, 2021.

(30) Foreign Application Priority Data

Nov. 13, 2020     (JP) ................................ 2020-189324

(51) Int. Cl.
 *H01M 50/562* (2021.01)
 *H01M 10/052* (2010.01)
 (Continued)

(52) U.S. Cl.
 CPC ........ *H01M 50/562* (2021.01); *H01M 10/052* (2013.01); *H01M 50/105* (2021.01);
 (Continued)

(58) Field of Classification Search
 CPC ............. H01M 50/562; H01M 50/105; H01M 50/193; H01M 50/197; H01M 50/178;
 (Continued)

(56) References Cited

U.S. PATENT DOCUMENTS

2015/0311483 A1 * 10/2015 Takada ................ H01M 50/562
                                                            429/185
2021/0234222 A1 † 7/2021 Hiraki

FOREIGN PATENT DOCUMENTS

JP     2008-004316 A     1/2008
JP     2009-259739 A     11/2009
                 (Continued)

OTHER PUBLICATIONS

European Extended Search Report issued in corresponding European Patent Application No. 21891852.2 dated Mar. 20, 2024 (5 pages).
                 (Continued)

*Primary Examiner* — Matthew W Van Oudenaren
(74) *Attorney, Agent, or Firm* — Foley & Lardner LLP

(57) ABSTRACT

A terminal resin film of at least seven layers, with at least a layer A, a layer B, a layer C, and a layer D, and a structure being layer A, the layer B, the layer A, and the layer C or the layer D; or, the structure being layer A, the layer B, and the layer A, and Layer A: A layer formed from a resin composition including an acid-modified polyolefin resin and having an MFR of 2.0 to 50 g/10 mins; Layer B: A layer formed from a resin composition including a polyolefin resin and having an MFR of 0.05 g/10 mins or more and less than 2.0 g/10 mins; Layer C: A layer formed from a resin composition including an unmodified polyolefin resin and having an MFR of 0.05 to 50 g/10 mins; and, Layer D: An adhesive layer including a resin having a cross-linked structure.

9 Claims, 5 Drawing Sheets

16

(51) Int. Cl.

| | |
|---|---|
| *H01M 50/105* | (2021.01) |
| *H01M 50/178* | (2021.01) |
| *H01M 50/183* | (2021.01) |
| *H01M 50/186* | (2021.01) |
| *H01M 50/193* | (2021.01) |
| *H01M 50/197* | (2021.01) |

(52) U.S. Cl.
  CPC ........ *H01M 50/178* (2021.01); *H01M 50/183* (2021.01); *H01M 50/186* (2021.01); *H01M 50/193* (2021.01); *H01M 50/197* (2021.01)

(58) Field of Classification Search
  CPC ............. H01M 50/183; H01M 50/186; H01M 10/052; B32B 7/02; B32B 7/12; B32B 15/095; B32B 15/18; B32B 15/20; B32B 27/32; B32B 27/34; B32B 27/08; B32B 27/18; B32B 27/36; B32B 27/40; B32B 2250/05; B32B 2250/242; B32B 2250/40; B32B 2307/54; B32B 2307/7376; B32B 2307/31; B32B 2451/00; B32B 2457/10; C09J 151/06; C09J 123/26
  See application file for complete search history.

(56) References Cited

FOREIGN PATENT DOCUMENTS

| | | | | |
|---|---|---|---|---|
| JP | 2010-218766 | A | | 9/2010 |
| JP | 2015-170428 | A | | 9/2015 |
| JP | 2015170428 | | * | 9/2015 |
| JP | 2015170428 4 | | † | 9/2015 |
| JP | 2017143062 | | * | 8/2017 |
| JP | 2017143062 | A | † | 8/2017 |
| JP | 6648400 | B2 | | 2/2020 |
| WO | WO-2019/244971 | A1 | | 12/2019 |

OTHER PUBLICATIONS

Patent Cooperation Treaty, "Third Party Observation," submitted in corresponding International Patent Application No. PCT/JP2021/041140, dated Mar. 10, 2023.
International Searching Authority, "International Search Report," issued in connection with International Patent Application No. PCT/JP2021/041140, dated Dec. 21, 2021.
International Searching Authority, "Written Opinion," issued in connection with International Patent Application No. PCT/JP2021/041140, dated Dec. 21, 2021.

\* cited by examiner
† cited by third party

<u>13</u>

16

1

TERMINAL RESIN FILM AND POWER STORAGE DEVICE USING SAME

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2021/041140, filed on Nov. 9, 2021, which in turn claims the benefit of JP 2020-189324, filed Nov. 13, 2020, the disclosures of all which are incorporated herein by reference in its entirety.

TECHNICAL FIELD

The present disclosure relates to terminal resin films and power storage devices using the same.

BACKGROUND

Recent years have seen an increase in demands for miniaturization of mobile devices, effective use of natural energy, and the like, and research and development have been conducted on high-energy-density lithium-ion secondary batteries (one type of power storage devices) from which a higher voltage can be output.

Conventionally, metal cans have often been used as packaging materials for use in the aforementioned lithium-ion secondary batteries, but recently, in response to demands for thinner and more diverse products to be applied, many packaging materials in which a laminate of a metal layer (for example, an aluminum foil) and a resin film are laminated in a bag shape has been increasingly used for the reason that the manufacturing cost is low. A laminated lithium-ion secondary battery in which a battery body is housed and sealed in the aforementioned packaging material includes a current extraction terminal that is referred to as a tab. The tab includes: a metal terminal (sometimes referred to as a "tab lead") which is connected to the negative or positive electrode of the battery body and extends outside the packaging material (exterior material); and a terminal resin film (sometimes referred to as "the tab sealant") which covers the outer peripheral surface of a portion of the metal terminal (for example, refer to Patent Literature (PTLs 1 to 3)). Generally, the terminal resin film is fused to the metal terminal.

[Citation List] [Patent Literature] [PTL 1] JP-2008-004316-A, [PTL 2] JP-2010-218766-A, and [PTL 3] JP-2009-259739-A

SUMMARY OF THE INVENTION

Technical Problem

In recent years, metal terminals have become thicker along with an increase in battery capacity and accordingly, there is a tendency that the demand for thicker terminal resin films is increasing. However, if the conventional thin terminal resin film is made thicker as it is, the adhesion to an exterior material under high-temperature conditions is likely to decrease, which can easily cause separation. Furthermore, the attempt to maintain the adhesion is likely to result in a reduction in the strength of terminal resin films, which is problematic.

The present disclosure has been made in view of the problems with the aforementioned conventional technique, and has an object to provide a terminal resin film that can be improved in terms of adhesion to an exterior material under high-temperature conditions, fracture strength, and fracture elongation in a well-balanced manner even when made thicker, as compared to the case where the conventional terminal resin film is made thicker as it is, and to provide a power storage device using the terminal resin film.

In order to achieve the aforementioned object, the present disclosure provides a terminal resin film that is disposed to cover an outer peripheral surface of a portion of a metal terminal electrically connected to a power storage device body constituting a power storage device. The terminal resin film includes at least seven layers. At least seven layers among layers constituting the terminal resin film each of which corresponds to at least one layer selected from the group consisting of a layer A, a layer B, a layer C, and a layer D indicated below. At least a portion of the terminal resin film has a structure in which the layer A, the layer B, the layer A, and the layer C are stacked in this order or the layer D, the layer A, the layer B, and the layer A are stacked in this order. Layer A: A layer formed from a resin composition including an acid-modified polyolefin resin and having a melt flow rate of 2.0 to 50 g/10 mins at 230° C. Layer B: A layer formed from a resin composition including a polyolefin resin and having a melt flow rate of 0.05 g/10 mins or more and less than 2.0 g/10 mins at 230° C. Layer C: A layer formed from a resin composition including an unmodified polyolefin resin and having a melt flow rate of 0.05 to 50 g/10 mins at 230° C. Layer D: An adhesive layer including a resin having a cross-linked structure.

The aforementioned terminal resin film can be improved in terms of the adhesion to an exterior material under high-temperature conditions, fracture strength, and fracture elongation in a well-balanced manner even when made thicker, as compared to the case where the conventional terminal resin film is made thicker as it is, by satisfying the above-described conditions regarding the layer configuration, the melt flow rate (MFR), the presence or absence of the acid modification, and the structure of the adhesive layer. The aforementioned terminal resin film has a multilayer structure including the above-described specific seven layers, and thus even when made thicker, can distribute stress appropriately and improve in terms of fracture strength and fracture elongation while maintaining the adhesion.

In the aforementioned terminal resin film, the acid-modified polyolefin resin used in the layer A may have a melting point of 100° C. or more and less than 160° C., the polyolefin resin used in the layer B may have a melting point of 130 to 175° C., and the unmodified polyolefin resin used in the layer C may have a melting point of 160 to 175° C.

In the aforementioned terminal resin film, the unmodified polyolefin resin used in the layer C may have a melting point higher than or equal to a melting point of the polyolefin resin used in the layer B.

All of the layers constituting the terminal resin film may correspond to at least one layer selected from the group consisting of the layer A, the layer B, and the layer D.

In the aforementioned terminal resin film, the layer D may be formed from an adhesive composition including: an acid-modified polyolefin resin; and at least one curing agent selected from the group consisting of a polyfunctional isocyanate compound, a glycidyl compound, a compound having a carboxy group, and a compound having an oxazoline group.

Among the layers constituting the terminal resin film, a total thickness of layers corresponding to the layer A may be greater than or equal to a total thickness of layers corresponding The total thickness of the aforementioned terminal resin film may be 160 μm or more.

Furthermore, the present disclosure provides a power storage device including: a power storage device body; a metal terminal electrically connected to the power storage device body; an exterior material holding the metal terminal therebetween and accommodating the power storage device body; and the terminal resin film according to the present disclosure that covers the outer peripheral surface of a portion of the metal terminal and is disposed between the metal terminal and the exterior material.

According to the present disclosure, it is possible to provide a terminal resin film that is improved in terms of the adhesion to an exterior material under high-temperature conditions, fracture strength, and fracture elongation in a well-balanced manner even when made thicker, as compared to the case where the conventional terminal resin film is made thicker as it is, and to provide a power storage device using the terminal resin film.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and t-dimensional size of the components, and the thickness ratio between the layers, are not to scale. Therefore, specific thicknesses and dimensions should be understood in view of the following description. As a matter of course, dimensional relationships or ratios may be different between the drawings Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

[Power Storage Device]

Figure 1:
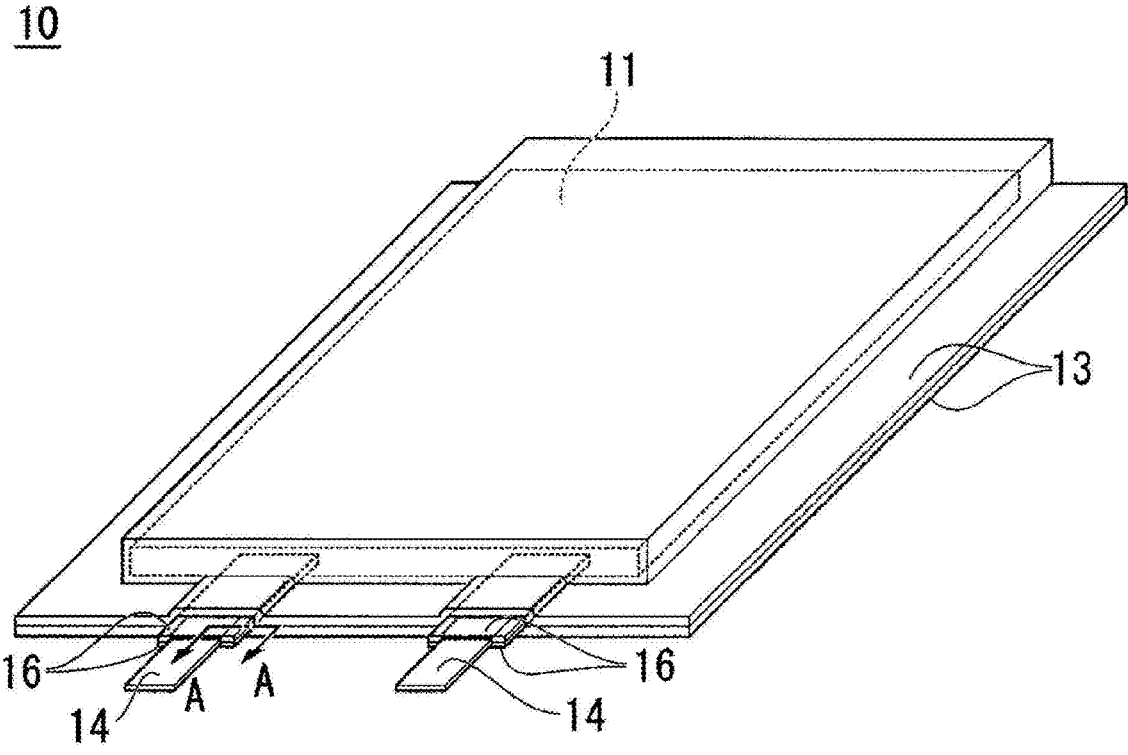
FIG. 1 is a perspective view illustrating a schematic configuration of a power storage device according to the present embodiment.

FIG. 1 is a perspective view illustrating a schematic configuration of a power storage device according to the present embodiment. In FIG. 1, a lithium-ion secondary battery is illustrated as one example of a power storage device 10, and description will be given below. Note that the lithium-ion secondary battery configured as illustrated in FIG. 1 is also referred to as a battery pack or a battery cell, for example.

The power storage device 10 illustrated in FIG. 1, which is a lithium-ion secondary battery, includes a power storage device body 11, an exterior material 13, a pair of metal terminals 14 (tab leads), and a terminal resin film 16 (tab sealant).

The power storage device body 11 is a battery body that is charged and discharged. The exterior material 13 is disposed to cover a surface of the power storage device body 11 and contact a portion of the terminal resin film 16.

Figure 2:
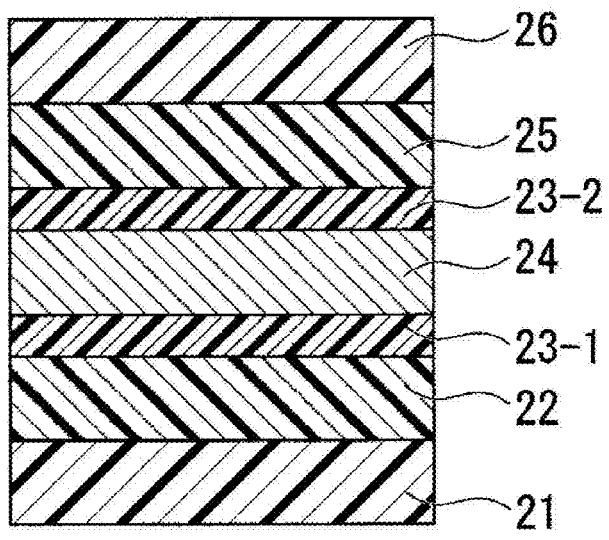
FIG. 2 is a cross-sectional view illustrating an example of a cross section of an exterior material illustrated in FIG. 1.

FIG. 2 is a cross-sectional view illustrating an example of a cross section of the exterior material 13 illustrated in FIG. 1. In FIG. 2, the components which are identical with those of the structure illustrated in FIG. 1 are given the same reference signs.

With reference to FIG. 2, one example of the configuration of the exterior material 13 will be described. The exterior material 13 has a seven-layer structure in which an inner layer 21, an inner-layer-side adhesive layer 22, an anti-corrosion treatment layer 23-1, a barrier layer 24, an anti-corrosion treatment layer 23-2, an outer-layer-side adhesive layer 25, and an outer layer 26 are sequentially stacked from an inner side on which the exterior material 13 contacts the power storage device body 11.

The inner layer 21 is a sealant layer that provides heat-seal sealability to the exterior material 13, and is a layer that is positioned inside and heat-sealed (thermally fused) upon assembly of the power storage device 10. The base material of the inner layer (sealant layer) 21 can be, for example, a polyolefin resin or an acid-modified polyolefin resin obtained by graft modification of a polyolefin resin with a maleic anhydride or the like. Examples of the polyolefin resin can include: low-density polyethylene, middle-density polyethylene, and high-density polyethylene; an ethylene-α olefin copolymer; homo, block, or random polypropylene; and a propylene-α olefin copolymer. The polyolefin resin preferably includes polypropylene among these. One of these types of the polyolefin resin can be used alone, or two or more of these types of the polyolefin resin can be used in combination.

The inner layer 21 may be a single-layer film or a multilayer film in which a plurality of layers are stacked, depending on required functions. Specifically, the inner layer 21 may be a multilayer film that includes resins such as an ethylene-cyclic olefin copolymer and polymethylpentene in order to provide moisture resistance. The inner layer 21 may include various additives (such as a flame retardant, a slip agent, an anti-blocking agent, an antioxidant, a light stabilizer, and a tackifier).

The thickness of the inner layer 21 is preferably 10 to 150 μm, and more preferably 30 to 80 μm. When the thickness of the inner layer 21 is 10 μm or more, sufficient heat-seal adhesion between the exterior materials 13 and sufficient adhesion between the exterior material 13 and the terminal resin film 16 can be obtained. When the thickness of the inner layer 21 is 150 μm or less, the cost of the exterior material 13 can be reduced.

For the inner-layer-side adhesive layer 22, a known adhesive such as an adhesive for dry lamination or an acid-modified thermal adhesive resin can be selected and used as appropriate.

From the perspective of cost reduction, it is preferable that the anti-corrosion treatment layers 23-1, 23-2 be formed on both sides of the barrier layer 24 as illustrated in FIG. 2, but the anti-corrosion treatment layer 23-1 may be disposed only on a surface of the barrier layer 24 that is located on the inner-layer-side adhesive layer 22 side The barrier layer 24 may be a metal layer which is electrically conductive. Examples of the material of the barrier layer 24 include aluminum and stainless steel; aluminum is preferable from the perspective of cost, mass (density), or the like.

For the outer-layer-side adhesive layer 25, a polyurethane-based adhesive that contains polyester polyol, polyether polyol, or acrylic polyol as a base compound can be used, for example.

The outer layer 26 may be a multilayer or single-layer film of nylon, polyethylene terephthalate (PET), or the like. Similar to the inner layer 21, the outer layer 26 may include various additives (such as a flame retardant, a slip agent, an anti-blocking agent, an antioxidant, a light stabilizer, and a tackifier). The outer layer 26 may include a protective layer formed by lamination of a resin that is insoluble in an electrolyte solution or by coating of a resin component that is insoluble in the electrolyte solution, in case of leakage of the electrolyte solution.

Figure 3:
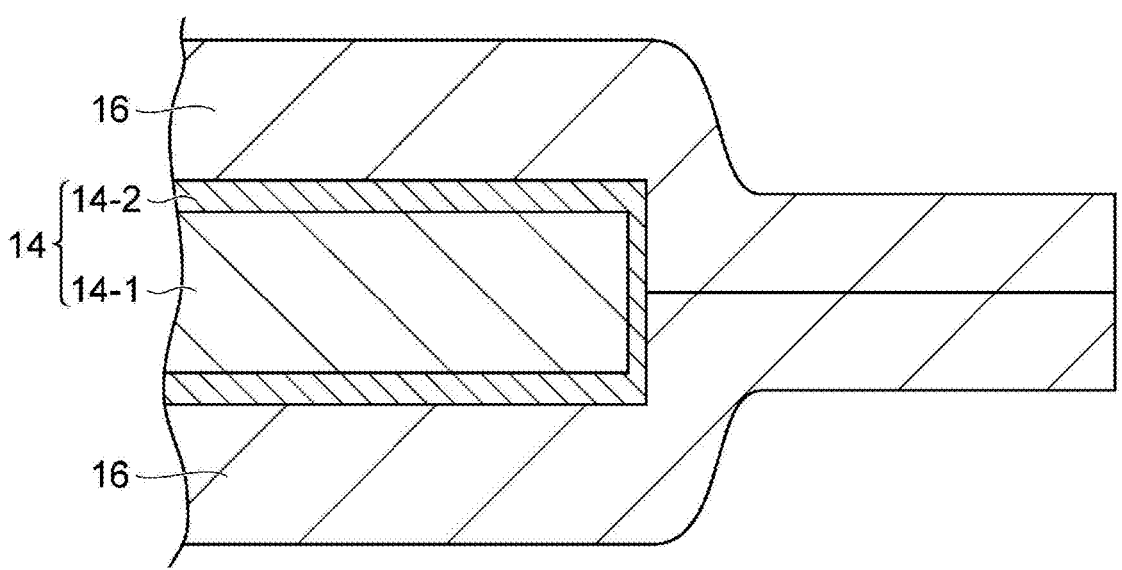
FIG. 3 is a cross-sectional view of a terminal resin film and metal terminals illustrated in FIG. 1, taken along line A-A.

FIG. 3 is a cross-sectional view of the terminal resin film and metal terminals illustrated in FIG. 1, taken along line A-A. In FIG. 3, the components which are identical with those of the structure illustrated in FIG. 1 are given the same reference signs.

As illustrated in FIGS. 1 and 3, the pair of (in the case of FIG. 1, two) metal terminals 14 include a metal terminal body 14-1 and an anti-corrosion layer 14-2. Among the pair of metal terminal bodies 14-1, a first metal terminal body 14-1 is electrically connected to the positive electrode of the power storage device body 11, and a second metal terminal body 14-1 is electrically connected to the negative electrode of the power storage device body 11. The pair of metal terminal bodies 14-1 are extended in a direction away from the power storage device body 11, while being partially exposed from the exterior material 13. The pair of metal terminal bodies 14-1 may each have a plate-like shape, for example.

As the material of the metal terminal body 14-1, a metal can be used. The metal to be used as the materials of the metal terminal body 14-1 can be determined, for example, in consideration of the structure of the power storage device body 11 and the materials of the components of the power storage device body 11, and the like.

When the power storage device 10 is a lithium-ion secondary battery, aluminum can be used as a positive electrode current collector, and copper can be used as a negative electrode current collector. When the power storage device 10 is a lithium-ion secondary battery, it is preferable that the material of the metal terminal body 14-1 to be connected to the positive electrode of the power storage device body 11 be aluminum. Moreover, from the perspective of the corrosion resistance to the electrolyte solution, it is more preferable that the material of the metal terminal body 14-1 to be connected to the positive electrode of the power storage device body 11 be an aluminum material with a purity of 97% or more such as 1N30. Furthermore, when the metal terminal body 14-1 is bent, it is preferable to use a metal material which is tempered by sufficient annealing for the purpose of adding flexibility. It is preferable that the material of the metal terminal body 14-1 to be connected to the negative electrode of the power storage device body 11 be nickel or copper with a nickel-plated layer on a surface.

The thickness of the metal terminal body 14-1 can be determined according to the size, capacity, etc., of the lithium-ion secondary battery. When the lithium-ion secondary battery is small, the thickness of the metal terminal body 14-1 may be 50 μm or more. In the case of a large lithium-ion secondary battery for power storage, vehicles, etc., the thickness of the metal terminal body 14-1 can be set as appropriate in the range of 100 to 500 μm.

The anti-corrosion layer 14-2 is disposed to cover the surfaces of the metal terminal bodies 14-1. In the case of a lithium-ion secondary battery, an electrolyte solution includes a corrosive component such as $LiPF6$. The anti-corrosion layer 14-2 is a layer for suppressing corrosion of the metal terminal body 14-1 that is caused by the corrosive component such as $LiPF6$ included in the electrolyte solution.

[Terminal Resin Film]

As illustrated in FIG. 3, the terminal resin film 16 according to the present embodiment is disposed to cover the outer peripheral surface of a portion of the metal terminal 14. The terminal resin film 16 includes at least seven layers, in which the at least seven layers constituting the terminal resin film 16 correspond to at least one layer selected from the group consisting of a layer A, a layer B, a layer C, and a layer D indicated below, and at least a portion of the terminal resin film 16 has a structure in which the layer A, the layer B, the layer A, and the layer C are stacked in this order or the layer D, the layer A, the layer B, and the layer A are stacked in this order.

Layer A: A layer formed from a resin composition including an acid-modified polyolefin resin and having a melt flow rate of 2.0 to 50 g/10 mins at 230° C.

Layer B: A layer formed from a resin composition including a polyolefin resin and having a melt flow rate of 0.05 g/10 mins or more and less than 2.0 g/10 mins at 230° C.

Layer C: A layer formed from a resin composition including an unmodified polyolefin resin and having a melt flow rate of 0.05 to 50 g/10 mins at 230° C.

Layer D: An adhesive layer including a resin having a cross-linked structure.

The melt flow rate (MFR) of each of the layer A, the layer B, and the layer C can be measured using a melt flow rate meter under the condition that the measurement temperature is 230° C. Furthermore, it is possible to control the MFR of each of the layer A, the layer B, and the layer C to be within a predetermined range by adjusting the type, the molecular weight, etc., of the resin, the additives, and the like.

Figure 4:
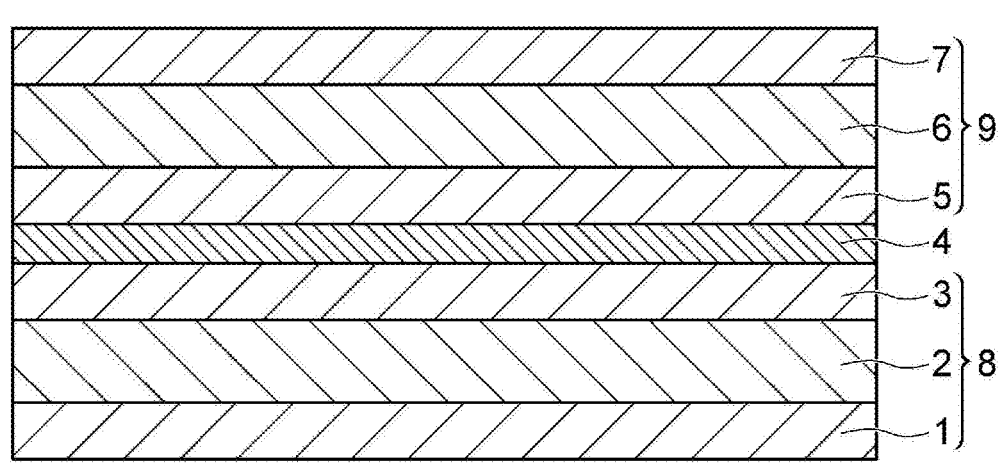
FIG. 4 is a schematic cross-sectional view illustrating one embodiment of the terminal resin film.

FIG. 4 is a schematic cross-sectional view illustrating one embodiment of the terminal resin film according to the present embodiment. The terminal resin film 16 illustrated in FIG. 4 has a structure in which a layer A 1, a layer B 2, a layer A 3, a layer C or D 4, a layer A 5, a layer B 6, and a layer A 7 are stacked in this order. The terminal resin film 16 illustrated in FIG. 4 has a structure in which a three-layer film 8 made up of the layer A 1, the layer B 2, and the layer A 3, and a three-layer film 9 made up of the layer A 5, the layer B 6, and the layer A 7 are stacked via the layer C or D 4. Hereinafter, each of these layers will be described.

The layer A is formed from a resin composition including an acid-modified polyolefin resin. Examples of the acid-modified polyolefin resin include resins obtained by graft modification of a polyolefin resin with a maleic anhydride, a carboxylic acid, a sulfonic acid, derivatives thereof, and the like. The acid-modified polyolefin resin is preferably a polyolefin resin modified with a maleic anhydride because the heat-seal strength tends to improve more than the case where other groups are used in the modification. Examples of the polyolefin resin include: low-density polyethylene, middle-density polyethylene, and high-density polyethylene; an ethylene-α olefin copolymer; homo, block, or random polypropylene; a propylene-α olefin copolymer; polybutene; polymethylpentene; and polynorbornene. From the perspective of heat-seal strength and workability, the polyolefin resin preferably includes polypropylene among these. One of these types of the polyolefin resin may be used alone, or two or more of these types of the polyolefin resin may be used in combination. Furthermore, the resin composition used to form the layer A may or may not include a resin other than the acid-modified polyolefin resin.

The modification rate of the polyolefin resin with an acid (for example, the mass of a portion derived from the maleic anhydride relative to the total mass of maleic anhydride-modified polypropylene) is preferably 0.1 to 20% by mass and more preferably 0.3 to 5% by mass from the perspective of heat-seal strength improvement.

The melting point of the acid-modified polyolefin resin used in the layer A is preferably 100° C. or more and less than 160° C., more preferably 110 to 150° C., and still more preferably 120 to 140° C. When the melting point of the acid-modified polyolefin resin is 100° C. or more, the adhesion to the exterior material under high-temperature conditions can be further improved. When the melting point of the acid-modified polyolefin resin is less than 160° C., the resin can easily be melted at the time of heat sealing, and thus the heat-seal strength can be further improved.

In the present specification, the melting point of a resin is measured using a differential scanning calorimeter (DSC), by taking the peak top of the largest heat of dissolution as the main peak, and then reading the temperature of the peak.

The resin composition used to form the layer A may include resin additives such as an antioxidant, a slip agent, a flame retardant, a light stabilizer, a dehydrating agent, a color pigment, a tackifier, a filler, and a crystal nucleating agent. A plurality of types of these additives may be blended. In particular, from the perspective of improvement in the visibility of the terminal resin film, the resin composition may include a color pigment, a filler, or the like.

Examples of the color pigment include carbon black, a quinacridone-based pigment, a polyazo-based pigment, and an isoindolinone-based pigment.

Examples of the filler includes inorganic fillers such as an aluminum oxide, silicon oxide, magnesium oxide, zirconium oxide, calcium carbonate, zirconium silicate, zinc oxide, barium sulfate, copper oxide, cobalt oxide, titanium oxide, tin oxide, iron oxide, antimony oxide, boron nitride, aluminum nitride, and silicon nitride.

The thickness (per-layer thickness) of the layer A is preferably 10 to 150 μm, more preferably 15 to 100 μm, and still more preferably 20 to 50 μm. When the thickness of the layer A is 10 μm or more, the adhesion between the exterior material and the terminal resin film under high-temperature conditions can be further improved. Furthermore, from the perspective of workability, film fracture strength, and the like, the thickness of the layer A is preferably 150 μm or less.

The MR. of the layer A at 230° C. is 2.0 to 50 g/10 mins, preferably 3.0 to 25 g/10 mins, and more preferably 5.0 to 15 g/10 mins. When the MFR of the layer A is 2.0 g/10 min or more, the fracture elongation of the terminal resin film can be improved. When the MFR of the layer A is at most 50 g/10 mines, the fracture strength of the terminal resin film can be improved.

The layer B is formed from a resin composition including a polyolefin resin. Examples of the polyolefin resin include: low-density polyethylene, middle-density polyethylene, and high-density polyethylene; an ethylene-α olefin copolymer; homo, block, or random polypropylene; a propylene-α olefin copolymer; polybutene; polymethylpentene; and polynorbornene. From the perspective of heat-seal strength and workability, the polyolefin resin preferably includes polypropylene among these. The polyolefin resin used in the layer B may be an acid-modified polyolefin resin or may be an unmodified polyolefin resin, but is preferably an unmodified polyolefin resin from the perspective of insulating properties. One of these types of the polyolefin resin may be used alone, or two or more of these types of the polyolefin resin may be used in combination. Furthermore, the resin composition used to form the layer B may or may not include a resin other than the polyolefin resin.

The melting point of the polyolefin resin used in the layer B is preferably 130 to 175° C., more preferably 150 to 170° C., and still more preferably 160 to 168° C. When the melting point of the polyolefin resin is 130° C. or more, the adhesion to the exterior material under high-temperature conditions can be further improved. When the melting point of the polyolefin resin is 175° C. or less, the resin can easily be melted at the time of heat sealing, meaning that the heat-seal strength can be further improved. Note that, for example, a resin having a melting point of 130° C. and a resin having a melting point of 160° C. may be blended and used; in other words, a plurality of resins having different melting points may be blended and used.

The resin composition used to form the layer B may include resin additives such as an antioxidant, a slip agent, a flame retardant, a light stabilizer, a dehydrating agent, a color pigment, a tackifier, a filler, and a crystal nucleating agent. A plurality of types of these additives may be blended. In particular, from the perspective of improvement in the visibility of the terminal resin film, the resin composition may include a color pigment, a filler, or the like. Examples of the color pigment and the filler include those indicated for the layer A.

The thickness (per-layer thickness) of the layer B is preferably 10 to 150 μm, more preferably 15 to 100 μm, and still more preferably 20 to 50 μm. When the thickness of the layer B is 10 μm or more, the adhesion between the exterior material and the terminal resin film under high-temperature conditions can be further improved. Furthermore, from the perspective of workability, film fracture elongation, and the like, the thickness of the layer B is preferably 150 μm or less.

The MFR of the layer B at 230° C. is 0.05 g/10 mins or more and less than 2.0 g/10 mins, preferably 0.1 to 1.5 g/10 mins, and more preferably 0.5 to 1.0 g/10 mins. When the MFR of the layer B is 0.05 g/10 mins or more, the fracture elongation of the terminal resin film can be improved. When the MFR of the layer B is less than 2.0 g/10 mins, the fracture strength of the terminal resin film can be improved.

The layer C is formed from a resin composition including an unmodified polyolefin resin. Examples of the unmodified polyolefin resin include: low-density polyethylene, middle-density polyethylene, and high-density polyethylene; an ethylene-$\alpha$ olefin copolymer; homo, block, or random polypropylene; a propylene-$\alpha$ olefin copolymer; polybutene; polymethylpentene; and polynorbornene. From the perspective of heat-seal strength and workability, the unmodified polyolefin resin preferably includes polypropylene among these. One of these types of the unmodified polyolefin resin may be used alone, or two or more of these types of the unmodified polyolefin resin may be used in combination. Furthermore, the resin composition used to form the layer C may or may not include a resin other than the unmodified polyolefin resin. Furthermore, from the perspective of the adhesion between the exterior material and the terminal resin film under high-temperature conditions, it is preferable that the resin composition used to form the layer C include only the unmodified polyolefin resin as the polyolefin resin, but include no acid-modified polyolefin resin.

The melting point of the unmodified polyolefin resin used in the layer C is preferably 160 to 175° C., more preferably 160 to 170° C., and still more preferably 162 to 168° C. When the melting point of the unmodified polyolefin resin is 160° C. or more, the adhesion to the exterior material under high-temperature conditions can be further improved. When the melting point of the polyolefin resin is 175° C. or less, the resin can easily be melted at the time of heat sealing, meaning that the heat-seal strength can be further improved It is preferable that the condition TmC≥TmB be satisfied where TmC (° C.) is the melting point of the unmodified polyolefin resin used in the layer C and TmB (° C.) is the melting point of the polyolefin resin used in the layer B. Furthermore, the value determined by TmC–TmB is more preferably 1 to 25 (° C.) and still more preferably 2 to 15 (° C.). When the condition TmC≥TmB is satisfied, it is possible to minimize the decrease in the heat-seal strength under high-temperature conditions. Furthermore, when the value determined by TmC–TmB is 25 (° C.) or less, it is possible to improve the workability of the terminal resin film.

The resin composition used to form the layer C may include resin additives such as an antioxidant, a slip agent, a flame retardant, a light stabilizer, a dehydrating agent, a color pigment, a tackifier, a filler, and a crystal nucleating agent. A plurality of types of these additives may be blended. In particular, from the perspective of improvement in the visibility of the terminal resin film, the resin composition may include a color pigment, a filler, or the like. Examples of the color pigment and the filler include those indicated for the layer A.

The thickness (per-layer thickness) of the layer C is preferably 2 to 150 μm, more preferably 3 to 100 μm, and still more preferably 4 to 50 μm. When the thickness of the layer C is 2 μm or more, it is possible to improve the adhesion between the exterior material and the terminal resin film under high-temperature conditions. Furthermore, from the perspective of workability, film fracture elongation, and the like, the thickness of the layer C is preferably 150 μm or less.

The MFR of the layer C at 230° C. is 0.05 to 50 g/10 mins, preferably 1.0 to 25 g/10 mins, and more preferably 2.0 to 15 g/10 mins. When the MFR of the layer C is 0.05 g/10 mins or more, the fracture elongation of the terminal resin film can be improved. When the MFR of the layer C is 50 g/10 mins or less, the fracture strength of the terminal resin film can be improved.

The layer D is an adhesive layer including a resin having a cross-linked structure. Examples of the resin having the cross-linked structure include a cross-linked acrylic resin, an epoxy resin, a phenol resin, a urea resin, a melamine resin, a polyurethane resin, and an acid-modified polyolefin resin cross-linked by isocyanate, epoxy, or the like. The resin having the cross-linked structure preferably includes the cross-linked acid-modified polyolefin resin among these. From the perspective of the adhesion between sealant layers, the layer D is preferably a layer formed from an adhesive composition including an acid-modified polyolefin resin and at least one curing agent selected from the group consisting of a polyfunctional isocyanate compound, a glycidyl compound, a compound having a carboxy group, and a compound having an oxazoline group. One of these types of the resin having the cross-linked structure can be used alone, or two or more of these types of the resin having the cross-linked structure can be used in combination.

The thickness of the layer D is preferably 1 to 10 μm and more preferably 2 to 5 μm from the perspective of the heat-seal strength of the terminal resin film.

The total thickness of the terminal resin film is preferably 150 μm or more, more preferably 160 μm or more, and still more preferably 200 μm or more. When the total thickness of the terminal resin film increases to be within the above range, the adhesion to the exterior material under high-temperature conditions is likely to decrease, but in the terminal resin film according to the present embodiment, the adhesion to the exterior material under high-temperature conditions, the fracture strength, and the fracture elongation can be improved in a well-balanced manner. The upper limit of the total thickness of the terminal resin film is not particularly limited and may be, for example, 1,000 μm or less.

It is preferable that the condition TA≥TB be satisfied where TA (μm) is the total thickness of layers corresponding to the layer A among the layers constituting the terminal resin film and TB (μm) is the total thickness of layers corresponding to the layer B among the layers constituting the terminal resin film. Furthermore, the value of TA/TB is more preferably 1.0 to 1.5. When the value of TA/TB is within the above range, the heat-seal strength can be further improved.

It is preferable that out of the total thickness of the terminal resin film, the total thickness of the layer A be 75% or less, the total thickness of the layer B be 60% or less, the total thickness of the layer C be 60% or less, and the total thickness of the layer D be 10% or less. By satisfying the above conditions, it is possible to improve the adhesion to the exterior material under high-temperature conditions, the fracture strength, and the fracture elongation in a well-balanced manner.

In the terminal resin film according to the present embodiment, the layer B may or may not further satisfy the conditions for the layer C. Furthermore, the layer C may or may not further satisfy the conditions for the layer B.

In the terminal resin film according to the present embodiment, the plurality of layers A may be layers formed from the same resin or may be layers formed from different resins. Furthermore, the plurality of layers A may be layers formed from the same resin composition or may be layers formed from different resin compositions. Moreover, the thicknesses, melting points, and MFRs of the plurality of layers A may be the same or different. From the perspective of workability and minimization of curling of the terminal resin film, it is preferable that all of the above-described elements of the plurality of layers A be the same.

In the terminal resin film according to the present embodiment, the plurality of layers B may be layers formed from the same resin or may be layers formed from different resins. Furthermore, the plurality of layers B may be layers formed from the same resin composition or may be layers formed from different resin compositions. Moreover, the thicknesses, melting points, and MFRs of the plurality of layers B may be the same or different. From the perspective of workability and minimization of curling of the terminal resin film, it is preferable that all of the above-described elements of the plurality of layers B be the same.

In the terminal resin film according to the present embodiment, when there are a plurality of layers C, the plurality of layers C may be layers formed from the same resin or may be layers formed from different resins. Furthermore, the plurality of layers C may be layers formed from the same resin composition or may be layers formed from different resin compositions. Moreover, the thicknesses, melting points, and MFRs of the plurality of layers C may be the same or different. From the perspective of workability and minimization of curling of the terminal resin film, it is preferable that all of the above-described elements of the plurality of layers C be the same.

When the terminal resin film according to the present embodiment has a stacked structure in which the layer A, the layer B, the layer A, the layer C, the layer A, the layer B, and the layer A are stacked, these layers may have the same thickness or may have different thicknesses. The proportion of the thicknesses of these layers in the stacked structure may be, for example, 1:2:1:1:1:2:1, 4:2:2:1:2:2:4, 5:3:2:1:2:3:5, or 5:10:5:1:5:10:5. The layer C is preferably thinner than the layer A and the layer B.

The terminal resin film according to the present embodiment may include other layers different than the layer A, the layer B, the layer C, and the layer D (layers that do not correspond to any of the layer A, the layer B, the layer C, and the layer D), but preferably includes no other layers. In other words, it is preferable that all of the layers constituting the terminal resin film correspond to at least one layer selected from the group consisting of the layer A, the layer B, the layer C, and the layer D. Furthermore, all of the layers constituting the terminal resin film may correspond to at least one layer selected from the group consisting of the layer A, the layer B, and the layer C, or may correspond to at least one layer selected from the group consisting of the layer A, the layer B, and the layer D. Moreover, the terminal resin film may include all of the layers A, B, C, and D.

In the terminal resin film according to the present embodiment, at least the outermost layer on the metal terminal side is preferably the layer A from the perspective of adhesion. Meanwhile, the outermost layer on the exterior material side does not need to be the layer A and may be, for example, a layer including an unmodified polyolefin resin, but from the perspective of handleability and minimization of curling of the terminal resin film, it is preferable that the outermost layers on both sides be the layers A.

A preferred embodiment of the present disclosure has thus far been described in detail, but the present disclosure is not limited to the specific embodiment and is subject to various modifications and changes without departing from the gist of the present disclosure recited in the claims.

For example, FIG. 4 illustrates the terminal resin film having the seven-layer structure in which the three-layer film 8 and the three-layer film 9 are stacked via the layer C or D 4, but the terminal resin film may have an 11-layer structure in which the three-layer film 8 is further stacked on the terminal resin film having the seven-layer structure via the layer C or D 4.

[Method for Manufacturing Terminal Resin Film]

Next, a method for manufacturing the terminal resin film 16 according to the present embodiment will be described. The method for manufacturing the terminal resin film 16 is not limited to the following.

In the case where the terminal resin film 16 has the seven-layer structure in which the layer A, the layer B, the layer A, the layer C, the layer A, the layer B, and the layer A are stacked, these seven layers may be stacked by the coextrusion method or may be partially formed in advance and then stacked by the sandwich laminate method. For example, after a three-layer film made up of the layer A, the layer B, and the layer A is formed in advance, two three-layer films may be stacked by the sandwich laminate method using a resin composition that constitutes the layer C.

In the case where the terminal resin film 16 has a seven-layer structure in which the layer A, the layer B, the layer A, the layer D, the layer A, the layer B, and the layer A are stacked, a three-layer film made up of the layer A, the layer B, and the layer A may be formed in advance, and then two three-layer films may be stacked by the dry laminate method using an adhesive composition that constitutes the layer D. Alternatively, after a three-layer film made up of the layer A, the layer B, and the layer A may be formed in advance, the layer A, the layer B, the layer A, and the layer D may be bonded by the Neelam laminate method to the three-layer film formed in advance.

The three-layer film or the like formed in advance can be manufactured using the coextrusion method such as the T-die extrusion method or the inflation method; from the perspective of film thickness stability, it is preferable to manufacture using the inflation method.

In the case where the number of layers constituting the terminal resin film 16 is eight or more, the above-described manufacturing method can be used in the manufacture, as appropriate.

As one example of the method for manufacturing the terminal resin film 16, a method in which the three-layer film is formed by the inflation method in advance and then two three-films are stacked using a resin composition that constitutes the layer C or an adhesive composition that constitutes the layer D will be described.

First, the base materials of the layer A, the layer B, and the layer A are prepared. Next, the base materials of the layer A, the layer B, and the layer A are supplied to an inflation shaping device. Next, as these three base materials are extruded from an extruder of the inflation shaping device to form a three-layer structure (a structure in which the layer A, the layer B, and the layer A are stacked), air (atmospheric air) is supplied from the inside of the extruded stacked body having the three-layer structure.

Subsequently, as the cylindrical three-layer film resulting from the inflation into the shape of a cylinder is conveyed, the cylindrical three-layer film is transformed into a low-profile shape using a guide unit and then is folded into the shape of a sheet using a pair of pinch rolls. Both end portions of the woven tube are slit, a pair (two strips) of films are wound on a take-up core into a roll, and thus the three-layer film in the form of a roll is manufactured.

The extrusion temperature is preferably in the range of 130 to 300° C. and more preferably 130 to 250° C. When the extrusion temperature is 130° C. or more, sufficient melting of the resin constituting each layer leads to reduced melt viscosity, and thus extrusion from a screw becomes stable. When the extrusion temperature is 300° C. or less, it is possible to minimize oxidation, degradation, etc., of the resin constituting each layer, and deterioration of the quality of the three-layer film can be prevented.

The number of revolutions of the screw, the blow ratio, the take-up speed, etc., can be set, as appropriate, in consideration of the thickness. The proportion of the thicknesses of the layers in the three-layer film can be adjusted by changing the number of revolutions of each screw.

Next, two three-layer films obtained are prepared, and the two three-layer films are stacked by the sandwich laminate method using the resin composition that constitutes the layer C or by the dry laminate method using the adhesive composition that constitutes the layer D.

In the case of stacking by the sandwich laminate method, the molten resin composition is extruded onto a first three-layer film, a second three-layer film is supplied and bonded onto the first three-layer film, and thus the terminal resin film having a seven-layer structure can be obtained.

In the case of stacking by the dry laminate method, the adhesive composition is applied onto a first three-layer film and then dried, a second three-layer film is supplied and thermally compressed onto the first three-layer film, and thus the terminal resin film having a seven-layer structure can be obtained. The drying can be performed on the condition that the temperature is 80 to 140° C. and the duration is 30 seconds to five minutes. Furthermore, after the stacking, aging may be performed on the condition that the temperature is 30 to 80° C. and the duration is 24 hours to 240 hours.

[Method for Fusing Terminal Resin Film]

A fusion process in which the terminal resin film 16 illustrated in FIG. 4 and the exterior material 13 are fusion-bonded together will be described. The following describes the case where the layer A 1 of the terminal resin film 16 illustrated in FIG. 4 is disposed facing the metal terminal and the layer A 7 thereof faces the exterior material.

In the fusion process, the terminal resin film 16 and the exterior material 13 are thermally fused while the melting of the layer A 7 by heating and the adhesion between the layer A 7 and the exterior material 13 by pressure are performed simultaneously.

In the fusion process, from the perspective of achieving sufficient adhesion and sealability between the terminal resin film 16 and the exterior material 13, it is preferable that the heating be performed up to a temperature greater than or equal to the melting point of the resin constituting the layer A 7.

The heating temperature for the terminal resin film 16 may be 140 to 170° C., for example. The processing time (the total of heating time and pressing time) can be determined in consideration of the adhesion to the exterior material and productivity. The processing time can be set as appropriate in the range of 1 to 60 seconds, for example.

From the perspective of improving production takt (productivity) of fused products, the thermal fusion may be performed at a temperature exceeding 170° C. with reduced pressing time. In this case, the heating temperature can be set to more than 170° cand 230° C. or less, for example, and the pressing time can be set to 3 to 20 seconds, for example.

Furthermore, with reference to FIG. 3, a fusion process in which the terminal resin film 16 and the metal terminal 14 according to the present embodiment are fusion-bonded together. In the fusion process, the terminal resin film 16 and the metal terminal 14 are thermally fused while the melting of the layer A 1 by heating and the adhesion between layer A 1 and the metal terminal 14 by pressure are performed simultaneously.

In the fusion process, from the perspective of achieving sufficient adhesion and sealability between the terminal resin film 16 and the metal terminal 14, it is preferable that the heating be performed up to a temperature greater than or equal to the melting point of the resin constituting the layer A 1.

The heating temperature for the terminal resin film 16 may be 140 to 170° C., for example. The processing time (the total of heating time and pressing time) can be determined in consideration of the adhesion to the metal terminal and productivity. The processing time can be set as appropriate in the range of 1 to 60 seconds, for example.

Hereinafter, the present disclosure will be specifically described on the basis of examples and comparative examples, but the present disclosure is not limited to the following examples.

[Materials Used]

Table 1 shows materials used in the examples and the comparative examples. In Table 1, PP represents polypropylene, the acid modification represents modification with a maleic anhydride, and the melting point represents the melting point of the resin used in each layer. The MFRs are the results of measurement of the melt flow rates of layers formed from different materials according to JIS K 7210 using a melt flow rate meter (manufactured by Toyo Seiki Seisaku-sho, Ltd., and measuring at a temperature of 230° C.). Note that in the present examples, even a layer that does not satisfy the condition for the layer A, the layer B, the layer C, or the layer D according to the present disclosure in terms of the presence or absence of the acid modification, the presence or absence of the cross-linked structure, or the MRF is classified as the layer A, the layer B, the layer C, or the layer D for the sake of comparison.

TABLE 1

| Layer | Material name | Composition | MFR (g/10 mins) at 230° C. | Melting point (° C.) |
| --- | --- | --- | --- | --- |
| Layer A | A1 | Acid-modified random PP | 7.0 | 140 |
| | A2 | Acid-modified random PP | 45 | 140 |
| | A3 | Acid-modified random PP | 2.5 | 140 |
| | A4 | Acid-modified homo PP | 7.5 | 162 |
| | A5 | Acid-modified random PP | 9.0 | 95 |
| | A6 | Acid-modified random PP | 55 | 138 |

TABLE 1-continued

| Layer | Material name | Composition | MFR (g/10 mins) at 230° C. | Melting point (° C.) |
|---|---|---|---|---|
| | A7 | Acid-modified random PP | 1.8 | 140 |
| | A8 | Random PP | 7.0 | 140 |
| Layer B | B1 | Block PP | 0.8 | 162 |
| | B2 | Block PP | 1.8 | 162 |
| | B3 | Block PP | 0.1 | 163 |
| | B4 | Polymethylpentene | 1.0 | 232 |
| | B5 | Random PP | 1.0 | 129 |
| | B6 | Block PP | 3.0 | 162 |
| | B7 | Block PP | 0.02 | 163 |
| Layer C | C1 | Homo PP | 7.0 | 164 |
| | C2 | Homo PP | 46 | 163 |
| | C3 | Homo PP | 0.1 | 165 |
| | C4 | Polymethylpentene | 9.0 | 221 |
| | C5 | Random PP | 8.0 | 128 |
| | C6 | Homo PP | 8.0 | 160 |
| | C7 | Homo PP | 54 | 163 |
| | C8 | Homo PP | 0.02 | 164 |
| Layer D | D1 | Acid-modified polyolefin + polyfunctional isocyanate cross-linked substance | — | — |
| | D2 | Polyfunctional epoxy + amine cross-linked substance | — | — |
| | D3 | Acid-modified polyolefin | — | 65 |

[Production of Terminal Resin Film]

Using the materials indicated in Tables 2 and 3, the terminal resin films were produced by stacking, in the order indicated in the tables, layers having the thicknesses indicated in the tables. A specific production method is as follows Examples 1 to 6, Comparative Examples 1 and 2

Two three-layer films in which three layers, namely, the layer A, the layer B, and the layer A, are stacked by the inflation method were produced. By stacking the two three-layer films by the sandwich laminate method using the material of the layer C, the terminal resin film having a seven-layer structure in which the layer A, the layer B, the layer A, the layer C, the layer A, the layer B, and the layer A are stacked was obtained.

Examples 7 to 14, Comparative Examples 3 to 8

Two three-layer films in which three layers, namely, the layer A, the layer B, and the layer A, are stacked by the inflation method were produced. By stacking the two three-layer films by the dry laminate method using the material of the layer D, the terminal resin film having a seven-layer structure in which the layer A, the layer B, the layer A, the layer D, the layer A, the layer B, and the layer A are stacked was obtained.

Three three-layer films in which three layers, namely, the layer A, the layer B, and the layer A, are stacked by the inflation method were produced. By stacking the three three-layer films by the sandwich laminate method using the material of the layer C, the terminal resin film having an eleven-layer structure in which the layer A, the layer B, the layer A, the layer C, the layer A, the layer B, the layer A, the layer C, the layer A, the layer B, and the layer A are stacked was obtained.

(Example 16) Three three-layer films in which three layers, namely, the layer A, the layer B, and the layer A, are stacked by the inflation method were produced. By stacking the three three-layer films by the dry laminate method using the material of the layer D, the terminal resin film having an eleven-layer structure in which the layer A, the layer B, the layer A, the layer D, the layer A, the layer B, the layer A, the layer D, the layer A, the layer B, and the layer A are stacked was obtained.

(Example 17) Three three-layer films in which three layers, namely, the layer A, the layer B, and the layer A, are stacked by the inflation method were produced. A seven-layer film was produced by stacking the two three-layer films by the sandwich laminate method using the material of the layer C. Next, by stacking the seven-layer film and the three-layer film by the dry laminate method using the material of the layer D, the terminal resin film having an eleven-layer structure in which (on the exterior material side) the layer A, the layer B, the layer A, the layer D, the layer A, the layer B, the layer A, the layer C, the layer A, the layer B, and the layer A (on the tab lead side) are stacked was obtained.

(Comparative Example 9) The terminal resin film having a five-layer structure was obtained by stacking five layers, namely, the layer A, the layer B, the layer A, the layer B, and the layer A, by the inflation method.

(Comparative Examples 10 and 11) Two two-layer films in which two layers, namely, the layer A and the layer B, are stacked by the inflation method were produced. By stacking the two two-layer films by the sandwich laminate method using the material of the layer C so that the layers B face each other, the terminal resin film having a five-layer structure in which the layer A, the layer B, the layer C, the layer B, and the layer A are stacked was obtained.

(Comparative Examples 12 and 13) The terminal resin film having a three-layer structure was obtained by stacking three layers, namely, the layer A, the layer B, and the layer A, by the inflation method.

(Comparative Examples 14 and 15) Two two-layer films in which two layers, namely, the layer A and the layer B, are stacked by the inflation method were produced. By stacking the two two-layer films by the dry laminate method using the material of the layer D so that the layers B face each other, the terminal resin film having a five-layer structure in which the layer A, the layer B, the layer D, the layer B, and the layer A are stacked was obtained.

[Thermal-Resistant Heat-Seal Strength for Exterior Material]

Figure 5:
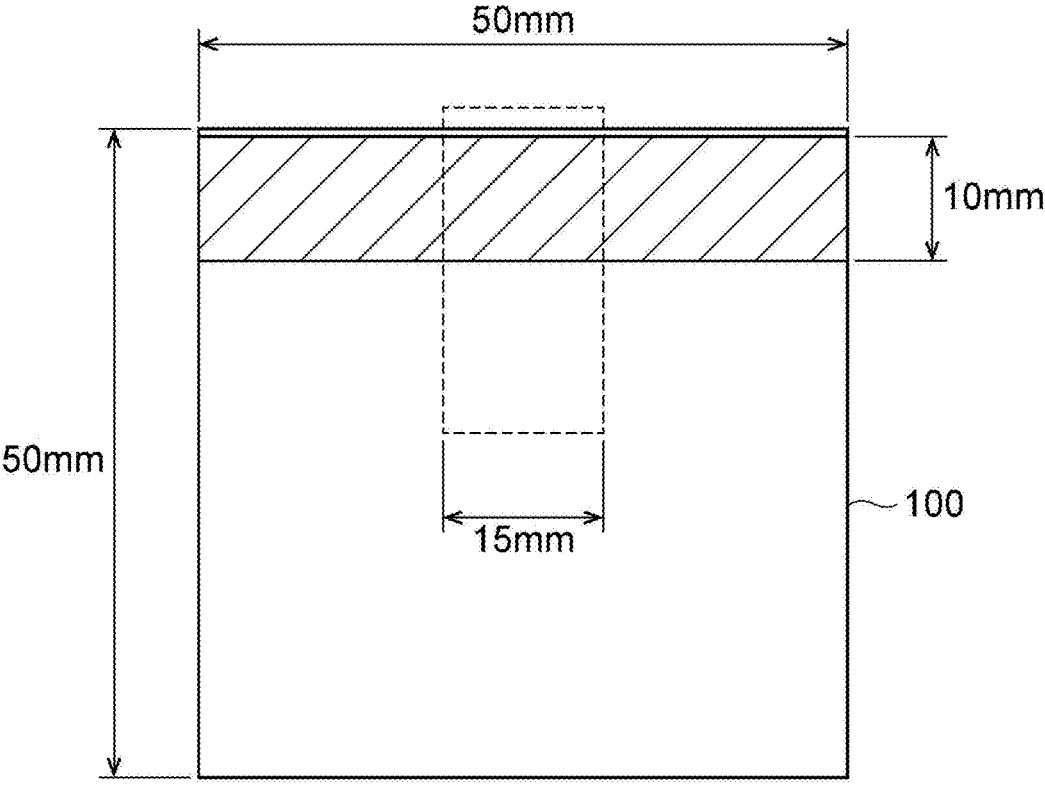
FIG. 5 is a schematic view for describing a method for preparing a sample for thermal-resistant heat-seal strength measurement of an exterior material in Examples.

A 50 mm (TD)×100 mm (MD) cut sample of the terminal resin film was folded in two so as to sandwich therebetween a chemically treated 50 mm×50 mm cut aluminum foil, and an end portion of the sample that is on the opposite side from the folded portion was heat-sealed at 165° C. at 0.6 MPa for 10 seconds across a 10 mm width. Subsequently, the exterior material having a stacked structure in which a nylon film (25 μm thick), an adhesive, an aluminum foil (40 μm thick), and a polypropylene sealant layer (80 μm thick) are stacked was folded in two so that the sealant layer of the exterior material contacts the terminal resin film, and an end portion of the exterior material that is on the opposite side from the folded portion (that is the same as the heat-sealed portion of the terminal resin film and the aluminum foil) was heat-sealed at 190° C. at 0.5 MPa for 5 seconds across the width of 10 mm. Thereafter, a 15 mm-wide portion was cut out of the heat-sealed portion at the middle in the longitudinal direction thereof (refer to FIG. 5); thus, a sample for heat-seal strength measurement was produced. In the present evaluation, a stacked body 100 illustrated in FIG. 5 is made up of the exterior material, the terminal resin film, the aluminum foil, the terminal resin film, and the exterior material. A T-peel adhesion test about the adhesion between the exterior material and the terminal resin film was conducted on the heat-sealed portion of this sample using a tensile tester (manufactured by Shimadzu Corporation) under the condition that the ambient temperature is 60° C. and the tensile speed is 50 mm/min. Using the obtained results, the thermal-resistant heat-seal strength (burst strength) for the exterior material was evaluated on the basis of the following evaluation criteria. An evaluation A, B, or C represents a pass, and an evaluation D represents a fail. The results are shown in Tables 2 and 3.

A: The heat-seal strength is 50 N/15 mm or more

B: The heat-seal strength is 40 N/15 mm or more and less than 50 N/15 mm

C: The heat-seal strength is 30 N/15 mm or more and less than 40 N/15 mm

D: The heat-seal strength is less than 30 N/15 mm

[Fracture Strength, and Fracture Elongation]

The fracture strength and the fracture elongation of the terminal resin film in the MD direction were measured in a tensile test that complies with JIS K 6251 (test sample shape: the shape of a dumbbell, type #5 (6 mm wide) specified in JIS K 6251, marked line distance: 25 mm, distance between chucks: 50 mm, and tensile speed: 100 mm/min). In the tensile test, a tension device (manufactured by Shimadzu Corporation) was used. The fracture elongation was determined according to the following expression:

$$\text{Fracture elongation (\%)} = \{(\text{marked line distance (mm) upon fracture} - 25 \text{ (mm)})/25 \text{ (mm)}\} \times 100$$

Using the obtained results, the fracture strength and the fracture elongation were evaluated on the basis of the following evaluation criteria. An evaluation A, B, or C represents a pass, and an evaluation D represents a fail. The results are shown in Tables 2 and 3. (Fracture Strength)

A: 45 MPa or more

B: 40 MPa or more and less than 45 MPa

C: 35 MPa or more and less than 40 MPa

D: Less than 35 MPa (Fracture Elongation)

A: 600% or more

B: 550% or more and less than 600%

C: 500% or more and less than 550%

D: Less than 500%

TABLE 2

| | Constituent material/thickness | | | | | | | Thermal-resistant heat-seal strength | Fracture strength | Fracture elongation |
|---|---|---|---|---|---|---|---|---|---|---|
| Ex. 1 | A1 | B1 | A1 | C1 | A1 | B1 | A1 | A | A | A |
| | 25 μm | 50 μm | 25 μm | 5 μm | 25 μm | 50 μm | 25 μm | | | |
| Ex. 2 | A2 | B2 | A2 | C2 | A2 | B2 | A2 | A | C | A |
| | 25 μm | 50 μm | 25 μm | 5 μm | 25 μm | 50 μm | 25 μm | | | |
| Ex. 3 | A3 | B3 | A3 | C3 | A3 | B3 | A3 | A | A | C |
| | 25 μm | 50 μm | 25 μm | 5 μm | 25 μm | 50 μm | 25 μm | | | |
| Ex. 4 | A4 | B4 | A4 | C4 | A4 | B4 | A4 | C | A | A |
| | 25 μm | 50 μm | 25 μm | 5 μm | 25 μm | 50 μm | 25 μm | | | |
| Ex. 5 | A5 | B5 | A5 | C5 | A5 | B5 | A5 | C | A | A |
| | 25 μm | 50 μm | 25 μm | 5 μm | 25 μm | 50 μm | 25 μm | | | |
| Ex. 6 | A1 | B1 | A1 | C6 | A1 | B1 | A1 | B | A | A |
| | 25 μm | 50 μm | 25 μm | 5 μm | 25 μm | 50 μm | 25 μm | | | |
| Ex. 7 | A1 | B1 | A1 | D1 | A1 | B1 | A1 | A | A | A |
| | 25 μm | 50 μm | 25 μm | 3 μm | 25 μm | 50 μm | 25 μm | | | |
| Ex. 8 | A1 | B1 | A1 | D1 | A1 | B1 | A1 | A | A | A |
| | 40 μm | 20 μm | 20 μm | 3 μm | 20 μm | 20 μm | 40 μm | | | |
| Ex. 9 | A2 | B2 | A2 | D1 | A2 | B2 | A2 | A | C | A |
| | 25 μm | 50 μm | 25 μm | 3 μm | 25 μm | 50 μm | 25 μm | | | |
| Ex. 10 | A3 | B3 | A3 | D1 | A3 | B3 | A3 | A | A | C |
| | 25 μm | 50 μm | 25 μm | 3 μm | 25 μm | 50 μm | 25 μm | | | |
| Ex. 11 | A4 | B4 | A4 | D1 | A4 | B4 | A4 | C | A | A |
| | 25 μm | 50 μm | 25 μm | 3 μm | 25 μm | 50 μm | 25 μm | | | |
| Ex. 12 | A5 | B5 | A5 | D1 | A5 | B5 | A5 | C | A | A |
| | 25 μm | 50 μm | 25 μm | 3 μm | 25 μm | 50 μm | 25 μm | | | |
| Ex. 13 | A1 | B1 | A1 | D2 | A1 | B1 | A1 | B | A | A |
| | 25 μm | 50 μm | 25 μm | 3 μm | 25 μm | 50 μm | 25 μm | | | |
| Ex. 14 | A1 | B1 | A1 | D1 | A1 | B1 | A1 | B | A | A |
| | 20 μm | 60 μm | 20 μm | 3 μm | 20 μm | 60 μm | 20 μm | | | |

TABLE 2-continued

| | Constituent material/thickness | | | | | | | Thermal-resistant heat-seal strength | Fracture strength | Fracture elongation |
|---|---|---|---|---|---|---|---|---|---|---|
| Ex. 15 | A1 | B1 | A1 | C1 | A1 | B1 | A1 | A | A | A |
| | 25 μm | 50 μm | 25 μm | 5 μm | 25 μm | 50 μm | 25 μm | | | |
| | C1 | A1 | B1 | A1 | | | | | | |
| | 5 μm | 25 μm | 50 μm | 25 μm | | | | | | |
| Ex. 16 | A1 | B1 | A1 | D1 | A1 | B1 | A1 | A | A | A |
| | 25 μm | 50 μm | 25 μm | 3 μm | 25 μm | 50 μm | 25 μm | | | |
| | D1 | A1 | B1 | A1 | | | | | | |
| | 3 μm | 25 μm | 50 μm | 25 μm | | | | | | |
| Ex. 17 | A1 | B1 | A1 | D1 | A1 | B1 | A1 | A | A | A |
| | 25 μm | 50 μm | 25 μm | 3 μm | 25 μm | 50 μm | 25 μm | | | |
| | C1 | A1 | B1 | A1 | | | | | | |
| | 5 μm | 25 μm | 50 μm | 25 μm | | | | | | |

TABLE 3

| | Constituent material/thickness | | | | | | | Thermal-resistant heat-seal strength | Fracture strength | Fracture elongation |
|---|---|---|---|---|---|---|---|---|---|---|
| Com. Ex. 1 | A1 | B1 | A1 | C7 | A1 | B1 | A1 | A | D | A |
| | 25 μm | 50 μm | 25 μm | 5 μm | 25 μm | 50 μm | 25 μm | | | |
| Com. Ex. 2 | A1 | B1 | A1 | C8 | A1 | B1 | A1 | A | A | D |
| | 25 μm | 50 μm | 25 μm | 5 μm | 25 μm | 50 μm | 25 μm | | | |
| Com. Ex. 3 | A6 | B1 | A6 | D1 | A6 | B1 | A6 | A | D | A |
| | 25 μm | 50 μm | 25 μm | 3 μm | 25 μm | 50 μm | 25 μm | | | |
| Com. Ex. 4 | A7 | B1 | A7 | D1 | A7 | B1 | A7 | A | A | D |
| | 25 μm | 50 μm | 25 μm | 3 μm | 25 μm | 50 μm | 25 μm | | | |
| Com. Ex. 5 | A1 | B6 | A1 | D1 | A1 | B6 | A1 | A | D | A |
| | 25 μm | 50 μm | 25 μm | 3 μm | 25 μm | 50 μm | 25 μm | | | |
| Com. Ex. 6 | A1 | B7 | A1 | D1 | A1 | B7 | A1 | A | A | D |
| | 25 μm | 50 μm | 25 μm | 3 μm | 25 μm | 50 μm | 25 μm | | | |
| Com. Ex. 7 | A8 | B1 | A8 | D1 | A8 | B1 | A8 | D | A | A |
| | 25 μm | 50 μm | 25 μm | 3 μm | 25 μm | 50 μm | 25 μm | | | |
| Com. Ex. 8 | A1 | B1 | A1 | D3 | A1 | B1 | A1 | D | A | A |
| | 25 μm | 50 μm | 25 μm | 3 μm | 25 μm | 50 μm | 25 μm | | | |
| Com. Ex. 9 | A1 | B1 | A1 | B1 | A1 | | | D | A | A |
| | 25 μm | 50 μm | 55 μm | 50 μm | 25 μm | | | | | |
| Com. Ex. 10 | A1 | B1 | C1 | B1 | A1 | | | D | A | A |
| | 25 μm | 50 μm | 55 μm | 50 μm | 25 μm | | | | | |
| Com. Ex. 11 | A1 | B1 | C2 | B1 | A1 | | | D | A | A |
| | 25 μm | 50 μm | 55 μm | 50 μm | 25 μm | | | | | |
| Com. Ex. 12 | A1 | B1 | A1 | | | | | D | A | A |
| | 25 μm | 155 μm | 25 μm | | | | | | | |
| Com. Ex. 13 | A1 | B1 | A1 | | | | | D | A | A |
| | 68.3 μm | 68.3 μm | 68.3 μm | | | | | | | |
| Com. Ex. 14 | A1 | B1 | D1 | B1 | A1 | | | D | A | A |
| | 25 μm | 75 μm | 3 μm | 75 μm | 25 μm | | | | | |
| Com. Ex. 15 | A1 | B1 | D1 | B1 | A1 | | | D | A | A |
| | 50 μm | 50 μm | 3 μm | 50 μm | 50 μm | | | | | |

[Reference Signs List] 1, 3, 5, 7 . . . . Layer A; 2, 6 . . . . Layer B; 4 . . . . Layer C or Layer D; 8, 9 . . . . Three-layer film; 10 . . . . Power storage device; 11 . . . . Power storage device body; 13 . . . . Exterior material; 14 . . . . Metal terminal; 14-1 . . . . Metal terminal body; 14-2 . . . . Anti-corrosion layer, 16 . . . . Terminal resin film; 21 . . . . Inner layer; 22 . . . . Inner-layer-side adhesive layer, 23-1, 23-2 . . . . Anti-corrosion treatment layer, 24 . . . . Barrier layer, 25 . . . . Outer-layer-side adhesive layer, 26 . . . . Outer layer.

What is claimed is:

1. A terminal resin film that is disposed to cover an outer peripheral surface of a portion of a metal terminal electrically connected to a power storage device body constituting a power storage device, the terminal resin film, comprising:

at least seven layers, wherein the at least seven layers among layers constituting the terminal resin film each of which corresponds to at least one layer selected from a group consisting of a layer A, a layer B, a layer C, and a layer D indicated below, and wherein at least a portion of the terminal resin film has a structure in which the layer A, the layer B, the layer A, and the layer C are stacked in this order or the layer D, the layer A, the layer B, and the layer A are stacked in this order, where, the layer A is formed from a resin composition including an acid-modified polyolefin resin and having a melt flow rate of 2.0 to 50 g/10 mins at 230° C., the layer B is formed from a resin composition including a polyolefin resin and having a melt flow rate of 0.05 g/10 mins or more and less than 2.0 g/10 mins at 230° C., the layer C is formed from a resin composition including an unmodified polyolefin resin and having a melt flow rate of 0.05 to 50 g/10 mins at 230° C., and the layer D is an adhesive layer including a resin having a cross-linked structure.

2. The terminal resin film of claim 1, wherein
the acid-modified polyolefin resin used in the layer A has
a melting point of 100° C. or more and less than 160°
C., the polyolefin resin used in the layer B has a melting
point of 130 to 175° C., and the unmodified polyolefin
resin used in the layer C has a melting point of 160 to
175° C.

3. The terminal resin film of claim 1, wherein
the unmodified polyolefin resin used in the layer C has a
melting point higher than or equal to a melting point of
the polyolefin resin used in the layer B.

4. The terminal resin film of claim 1, wherein
all of the layers constituting the terminal resin film
correspond to at least one layer selected from a group
consisting of the layer A, the layer B, and the layer C.

5. The terminal resin film of claim 1, wherein
all of the layers constituting the terminal resin film
correspond to at least one layer selected from a group
consisting of the layer A, the layer B, and the layer D.

6. The terminal resin film of claim 1, wherein
the layer D is formed from an adhesive composition
including an acid-modified polyolefin resin and at least
one curing agent selected from a group consisting of a polyfunctional isocyanate compound, a glycidyl com-
pound, a compound having a carboxy group, and a
compound having an oxazoline group.

7. The terminal resin film of claim 1, wherein
among the layers constituting the terminal resin film, a
total thickness of layers corresponding to the layer A is
greater than or equal to a total thickness of layers
corresponding to the layer B.

8. The terminal resin film of claim 1, wherein
a total thickness is 160 μm or more.

9. A power storage device, comprising:
a power storage device body;
a metal terminal electrically connected to the power
storage device body;
an exterior material holding the metal terminal therebe-
tween and accommodating the power storage device
body; and
the terminal resin film of claim 1 that covers an outer
peripheral surface of a portion of the metal terminal and
is disposed between the metal terminal and the exterior
material.

\* \* \* \* \*